(12) United States Patent
Suzuki et al.

(10) Patent No.: US 7,096,286 B2
(45) Date of Patent: Aug. 22, 2006

(54) DISK ARRAY DEVICE AND METHOD OF CHANGING THE CONFIGURATION OF THE DISK ARRAY DEVICE

(75) Inventors: Hiroshi Suzuki, Sagamihara (JP); Hiromi Matsushige, Hiratsuka (JP); Masato Ogawa, Chigasaki (JP); Tomokazu Yokoyama, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 98 days.

(21) Appl. No.: 10/790,140

(22) Filed: Mar. 2, 2004

(65) Prior Publication Data

US 2005/0149653 A1  Jul. 7, 2005

(30) Foreign Application Priority Data

Jan. 5, 2004 (JP) ............................. 2004-000135

(51) Int. Cl.
G06F 13/12 (2006.01)
G06F 3/00 (2006.01)
(52) U.S. Cl. .......................................... 710/74; 710/14
(58) Field of Classification Search .................... 710/8, 710/14, 36, 38, 62, 64, 74
See application file for complete search history.

(56) References Cited

U.S. PATENT DOCUMENTS

| | | | |
|---|---|---|---|
| 5,960,455 A | 9/1999 | Bauman | |
| 6,006,296 A | 12/1999 | Gold et al. | |
| 6,425,049 B1 | 7/2002 | Yamamoto et al. | |
| 6,434,637 B1 * | 8/2002 | D'Errico | 710/38 |
| 6,532,547 B1 * | 3/2003 | Wilcox | 714/5 |
| 6,813,676 B1 | 11/2004 | Henry et al. | |
| 6,845,409 B1 * | 1/2005 | Talagala et al. | 710/20 |
| 2001/0049773 A1 * | 12/2001 | Bhavsar | 711/147 |
| 2001/0054133 A1 | 12/2001 | Murotani et al. | |
| 2002/0023195 A1 | 2/2002 | Okada | |
| 2003/0053772 A1 * | 3/2003 | Ikunishi et al. | 385/114 |
| 2004/0024951 A1 | 2/2004 | Aruga | |
| 2004/0034737 A1 | 2/2004 | Fujimoto et al. | |
| 2004/0083338 A1 | 4/2004 | Moriwaki et al. | |
| 2004/0111560 A1 | 6/2004 | Takase et al. | |

FOREIGN PATENT DOCUMENTS

JP  7-20994  1/1995

* cited by examiner

*Primary Examiner*—David E. Martinez

(57) ABSTRACT

The present invention enables the configuration of a disk array device to be changed in accordance with its purpose of use. Plural disk drive groups each comprising plural disk drives 81 are disposed in the same disk drive unit. Respective disk drive groups are connected to respectively different HDD control boards 82. Each HDD control board 82 is disposed with a connection circuit 200 and switch circuits 210. A signal is outputted from a management terminal to switch the switch circuits 210, whereby adjacent HDD control boards 82 can be connected and operated. Also, by switching the switch circuits 210, adjacent HDD control boards 82 can be mutually separated and operated independently.

6 Claims, 15 Drawing Sheets

DISK ARRAY DEVICE AND METHOD OF CHANGING THE CONFIGURATION OF THE DISK ARRAY DEVICE

CROSS-REFERENCE TO RELATED APPLICATION

This application relates to and claims priority from Japanese Patent Application No. 2004-000135, filed on Jan. 5, 2004, the entire disclosure of which is incorporated herein by reference.

BACKGROUND OF THE INVENTION

1. Field of the Invention

The present invention relates to a disk array device and a method of changing the configuration of the disk array device.

2. Description of the Related Art

A disk array device is a device where, for example, plural disk drives are disposed in an array and constructed on the basis of RAID (Redundant Array of Independent Inexpensive Disks) A logical volume that is a logical storage region is formed on a physical storage region that each disk drive has. A LUN (Logical Unit Number) is pre-corresponded to this logical volume. A host computer specifies the LUN, whereby the host computer issues a write command or a read command of a predetermined format with respect to the disk array device. Thus, the host computer can conduct reading and writing of desired data with respect to the disk array device.

As shown in FIG. 14, in the prior art (JP-A-7-20994), plural disk drives 510 are respectively connected to plural disk adapters (DKA) 500. Each disk drive 510 includes plural ports, and these plural ports are respectively connected to the DKA 500 via separate paths. An A port of each disk drive 510 is connected to the DKA 500 via connection boards 520A, and a B port of each disk drive 510 is connected to the DKA 500 via connection boards 520B. Thus, even if trouble arises in the path of either the A port or the B port, the disk drives 510 can be accessed via the other path serving as an alternate path. In the example shown in FIG. 14, RAID groups according to, for example, RAID 5 are configured by the plural disk drives 510 connected to respectively different DKA 500. Thus, even if trouble arises in any one of the disk drives 510 belonging to the same RAID group, data can be recovered on the basis of data stored in the other disk drives 510 belonging to the same RAID group.

As other prior art, the disk array device shown in FIG. 15 is conceivable. In this prior art, disk control units 601 and 602 and disk drives 610 are respectively connected via two connection boards 611 and 612. Each disk drive 610 is respectively disposed with an A port and a B port. The A-side disk control unit 601 shown at the left side of FIG. 15 is respectively connected to the A ports of the plural disk drives 610 via the A-side connection board 611. The B-side disk control unit 602 shown at the right side of FIG. 15 is respectively connected to the B ports of the plural disk drives 610 via the B-side connection board 612.

In recent years, there has been a demand for disk array devices with larger capacity and higher performance. The more the number of disk drives 510 connected to the DKA 500 increases, as in the prior art shown in FIG. 14, the more the processing time required for protocol conversion of interface units increases and data transfer speed also drops. Thus, when the connection number of the disk drives 510 is simply increased, the writing speed and the reading speed from the standpoint of the host computers using the disk array device end up dropping.

A case will be considered where, as shown in FIG. 14, trouble has respectively arisen at two places: sites F1 and F2. When either the connection board 520A or the connection board 520B is replaced in order to recover the trouble, the alternate path of the disk drives 510 connected to the trouble sites F1 and F2 is lost.

That is, in a case where, for example, the connection board 520A is first replaced, the disk drives 510 connected to the trouble site F2 can no longer be accessed from either the A ports or the B ports. This is because the path of the A ports is lost at the point in time when the connection board 520A is removed and the path of the B ports is unusable due to the trouble site F2. In a case where the connection board 520B is first replaced, the alternate path of the disk drives 510 connected to the trouble site F1 is lost. That is, the path of the A ports of the disk drives 510 is unusable due to the trouble site F1 and the path of the B ports is lost at the point in time when the connection board 520B is removed.

It is possible to access the disk drives 510 that are unrelated to the trouble sites F1 and F2. Thus, in a case where trouble has arisen at both of the trouble sites F1 and F2, data that is to be written to the disk drives 510 that have become inaccessible is recovered on the basis of the storage content of other disk drives 510 within the same RAID group after the connection boards 520A and 520B have been respectively replaced with normal connection boards. This data restoration processing (data recovery processing) must be completed before new trouble arises in the disk drives 510 related to the data recovery. This is because it becomes impossible to conduct data recovery in a case where new trouble has arisen prior to the completion of the data recovery processing. In a RAID 5, data can be recovered on the basis of the storage content of the remaining disk drives, even if one of the disk drives within the same RAID group is inaccessible. However, in a RAID 5, data cannot be recovered in a case where plural disk drives have become inaccessible in the same RAID group.

In this manner, in a case where trouble has respectively arisen at the plural trouble sites F1 and F2, it is necessary to conclude data recovery processing before new trouble arises. However, because there is a trend for the number of disk drives 510 connected to the DKA 500 to increase, there is a trend for the period required for data recovery to increase. Also, it is necessary to prevent as much as possible new trouble from arising in other disk drives 510 until the data recovery processing is completed. However, because there has been a demand in recent years for higher density packaging, higher data transfer speed and higher drive access speed, it is not at present simple to significantly lower the rate of occurrence of trouble in the connection boards 520A and 520B and the disk drives 510.

Additionally, in the prior art shown in FIG. 15, the A-side connection board 611 handles the connection to the A ports of the plural disk drive groups and the B-side connection board 612 handles the connection to the B ports of the plural disk drive groups. Thus, in a case where trouble has arisen in one of the connection boards and that connection board is replaced, the plural disk drive groups are affected when the connection board in which the trouble has arisen is removed. Thus, in the prior art shown in FIG. 15, there is the potential for the problems described in connection with FIG. 14 to arise and for the range of influence to increase.

SUMMARY OF THE INVENTION

Thus, it is an object of the present invention to provide a disk array device and a method of changing the configuration of the disk array device configured to be able to improve resistance with respect to trouble. It is another object of the present invention to provide a disk array device and a method of changing the configuration of the disk array device configured to be able to accommodate plural purposes of use using a common structure. It is still another object of the present invention to provide a disk array device and a method of changing the configuration of the disk array device configured to be able to improve maintenance and reliability. Further objects of the invention will become apparent from the description of the embodiments discussed later.

A disk array device according to the invention comprises: a channel adapter that controls data transmission and reception with a high-order device; a storage device that stores data; a storage device control board to which the storage device is connected; a disk adapter that is connected to the storage device via the storage device control board and controls data transmission and reception with the storage device; and a management unit that is respectively connected to the disk adapter and the channel adapter. The storage device control board includes a connection circuit that is connected to the storage device and switch circuits that are respectively disposed at an input side and an output side of the connection circuit and are switchable between a connected mode where they are connected to another adjacent storage device control board and an independent mode where they are separated from the other adjacent storage device control board. Moreover, the switch circuits are switchable between the connected mode and the independent mode by an output signal from the management unit.

When the connected mode is instructed by the management unit, the storage device control board and another storage device control board are connected by the switch circuits. Also, when the independent mode is instructed by the management unit, the storage device control board and the other storage device control board are respectively separated by the switch circuits. Thus, with the same basic structure, more storage devices can be connected to the disk adapter in the connected mode and the storage devices can be controlled by more disk adapters in the independent mode. Thus, a configuration corresponding to the purpose of use by a user can be realized relatively easily.

In one aspect of the invention, the storage device control board and the other storage device control board are respectively mounted on a same attachment-use board.

In another aspect of the invention, in a case where the switch circuits are in the connected mode, the storage device control board and the other storage device control board are respectively connected to the same disk adapter, and in a case where the switch circuits are in the independent mode, the storage device control board and the other storage device control board are connected to respectively different disk adapters.

In another aspect of the invention, the storage device includes a first port and a second port, with the first port and the second port being connected to respectively different storage device control boards and the storage device control boards being connected to respectively different disk adapters.

In another aspect of the invention, the connection circuit is configured by any of a port bypass circuit and a fibre channel switch.

In another aspect of the invention, respectively different colors are associated with input-side connectors and output-side connectors with which the disk adapter and the storage device control board are disposed, and respectively different colors are associated with signal lines associated with the first port and signal lines associated with the second port of signal lines connecting the respective connectors to each other.

DESCRIPTION OF THE PREFERRED EMBODIMENTS

Embodiments of the invention will be described below on the basis of FIGS. 1 through 13. In these embodiments, a storage device control board including a connection circuit that is connected to the storage device and switch circuits that are respectively disposed at an input side and an output side of the connection circuit and are switchable between a connected mode where they are connected to another adjacent storage device control board and an independent mode where they are separated from the other adjacent storage device control board is disclosed. Additionally, the switch circuits are switchable between the connected mode and the independent mode by an output signal from the management unit.

Also disclosed in these embodiments is a method of changing the configuration of a disk array device including a channel adapter that controls data transmission and reception with a high-order device, plural storage devices that respectively store data, a disk adapter that controls data transmission and reception with the storage devices, and a management unit that is respectively connected to the disk adapter and the channel adapter. In this configuration changing method, in a case where a connected mode instruction is issued from the management unit, the storage devices are connected to each other and to the same disk adapter, and in a case where an independent mode instruction is issued from the management unit, the storage devices are divided into plural storage device groups and the storage device groups are connected to respectively different disk adapters.

First Embodiment

Figure 1:
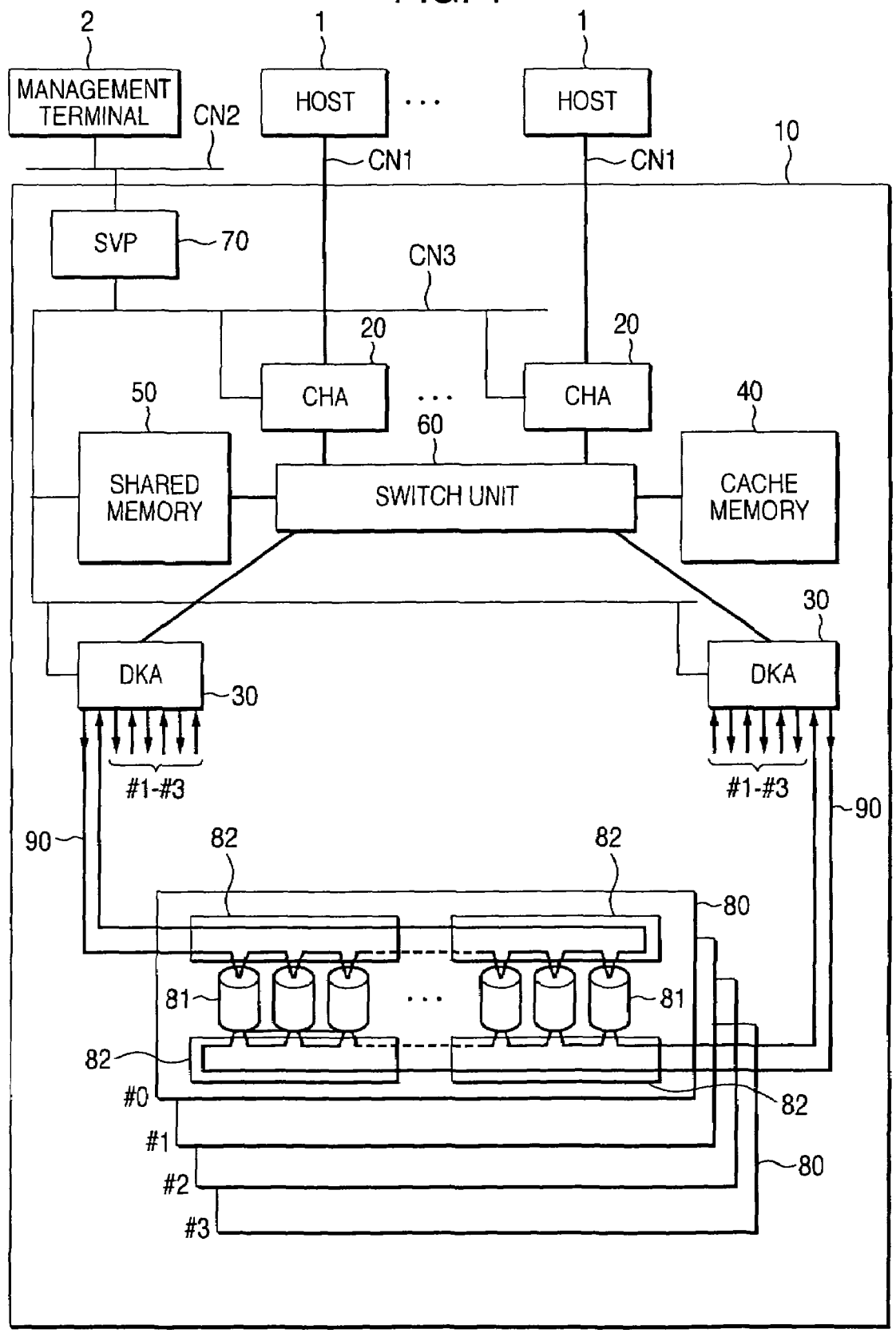
FIG. 1 is a block diagram showing the overall configuration in a case where a disk array device pertaining to an embodiment of the invention is operated in a connected mode.

FIG. 1 is a block diagram showing the overall configuration of a disk array device 10. The disk array device 10 is connected to plural host computers 1 via a communications network CN1 so that two-way communication is possible between the disk array device 10 and the host computers 1. Here, the communications network CN1 is, for example, a LAN (Local Area Network), a SAN (Storage Area Network), the Internet or a dedicated line. In a case where a LAN is used, data transfer between the host computers 1 and the disk array device 10 is conducted in accordance with the TCP/IP (Transmission Control Protocol/Internet Protocol) protocol. In a case where a SAN is used, the host computers 1 and the disk array device 10 conduct data transfer in accordance with the fibre channel protocol. Also, in a case where the host computers 1 are mainframes, data transfer is conducted in accordance with a communications protocol such as FICON (Fibre Connection: registered trademark), ESCON (Enterprise System Connection: registered trademark), ACONARC (Advanced Connection Architecture: registered trademark) or FIBARC (Fibre Connection Architecture: registered trademark).

Each host computer 1 is a computer realized as a server, a personal computer, a workstation or a mainframe. For example, each host computer 1 is connected via another communications network to plural client terminals positioned outside of the drawing. The host computers 1 read data from and write data to the disk array device 10 in response to a request from the client terminals, whereby services are provided to the client terminals.

The disk array device 10 is disposed with plural channel adapters (abbreviated below as CHA) 20, plural disk adapters (abbreviated below as DKA) 30, a cache memory 40, a shared memory 50, a switch unit 60, an SVP (Service Processor) 70 and a disk drive unit 80. Also, a management terminal 2 is connected to the disk array device 10 via a communications network CN2 such as a LAN.

Plural CHA 20 (e.g., 4 or 8) can be disposed in the disk array device 10. The CHA 20 receive data and commands to read and write data from the host computers 1 to which they are connected, and operate in accordance with the commands received from the host computers 1. To describe these beforehand including the operation of the DKA 30, when the CHA 20 receive a data read request from the host computers 1, the CHA 20 store a read command in the shared memory 50. The DKA 30 reference the shared memory 50 as needed, and when the DKA 30 discover an unprocessed read command, the DKA 30 read data from disk drives 81 and store the data in the cache memory 40. The CHA 20 read the data moved to the cache memory 40 and transmit the data to the host computer 1 responsible for issuing the command.

Also, when the CHA 20 receive a data write request from the host computers 1, the CHA 20 store a write command in the shared memory 50 and store the received data (user data) in the cache memory 40. After the CHA 20 store the data in the cache memory 40, the CHA 20 notify the host computer 1 of writing completion. Then, the DKA 30 read the data stored in the cache memory 40 and store the data in a predetermined disk drive 81 in accordance with the write command stored in the shared memory 50.

Plural DKA 30 (e.g., 4 or 8) can be disposed in the disk array device 10. The DKA 30 control data communication with the disk drives 81 and are respectively disposed with a processor unit, a data communication unit, a local memory (none of which is illustrated) and FC control units 31 (see FIG. 3). The DKA 30 and the disk drives 81 are connected via a communications network such as a SAN and conduct data transfer in block units in accordance with the fibre channel protocol.

The DKA 30 monitor as needed the statuses of the disk drives 81, and the monitoring results are sent to the SVP 70 via an internal communications network CN3. The CHA 20 and the DKA 30 are respectively disposed with a printed board, which is mounted with a processor and a memory, and a control program that is stored in the memory. The CHA 20 and the DKA 30 realize predetermined functions by the cooperation of this hardware and software.

The cache memory 40 stores, for example, user data. The cache memory 40 is configured by, for example, a nonvolatile memory. The cache memory 40 can be configured by plural memories and can multiply manage user data.

The shared memory (or control memory) 50 is configured by, for example, a nonvolatile memory. Control information is stored in the shared memory 50. It should be noted that information such as control information can be multiply managed by plural shared memories 50. The shared memory 50 and the cache memory 40 can each be plurally disposed.

The switch unit 60 connects the CHA 20, the DKA 30, the cache memory 40 and the shared memory 50. Thus, all of the CHA 20 and the DKA 30 can respectively access the cache memory 40 and the shared memory 50.

The SVP 70 collects information from the CHA 20 and the DKA 30 via a communications network CN3 such as an internal LAN. Examples of the information that the SVP 70 collects include device configuration, power alarms, temperature alarms and input/output speed (IOPS). The SVP 70 is connected to the management terminal 2 via the communications network CN2. The management terminal 2 can browse the various information collected by the SVP 70. Also, the management terminal 2 can instruct RAID setting, blockage processing and later-described configuration changes via the SVP 70.

The disk array device 10 is disposed with at least one disk drive unit 80. In the example shown in the drawing, four disk drive units 80 are shown. Plural disk drives 81 are respectively mounted on backboards of the disk drive units 80. Each disk drive 81 is realizable as, for example, a hard disk device or a semiconductor memory device. A RAID group can be formed by plural disk drives 81, and a logical storage region (logical volume (logical unit) or logical device (LDEV)) can be set on a physical storage region that the RAID group provides. Also, HDD control boards 82 for connecting to the disk drives 81 are mounted on the backboards of the disk drive units 80.

The HDD control boards 82 are plurally disposed at the port sides of the disk drives 81. That is, for example, two HDD control boards 82 are disposed at one port side of the disk drives 81, and two HDD control boards 82 are disposed at the other port side of the disk drives 81. In this manner, in the present embodiment, paths to each port of the disk drive group are formed by the plural HDD control boards 82, and the configuration of these paths can be changed. Additionally, the HDD control boards 82 are respectively connected to predetermined DKA 30 via cables 90.

Figure 2:
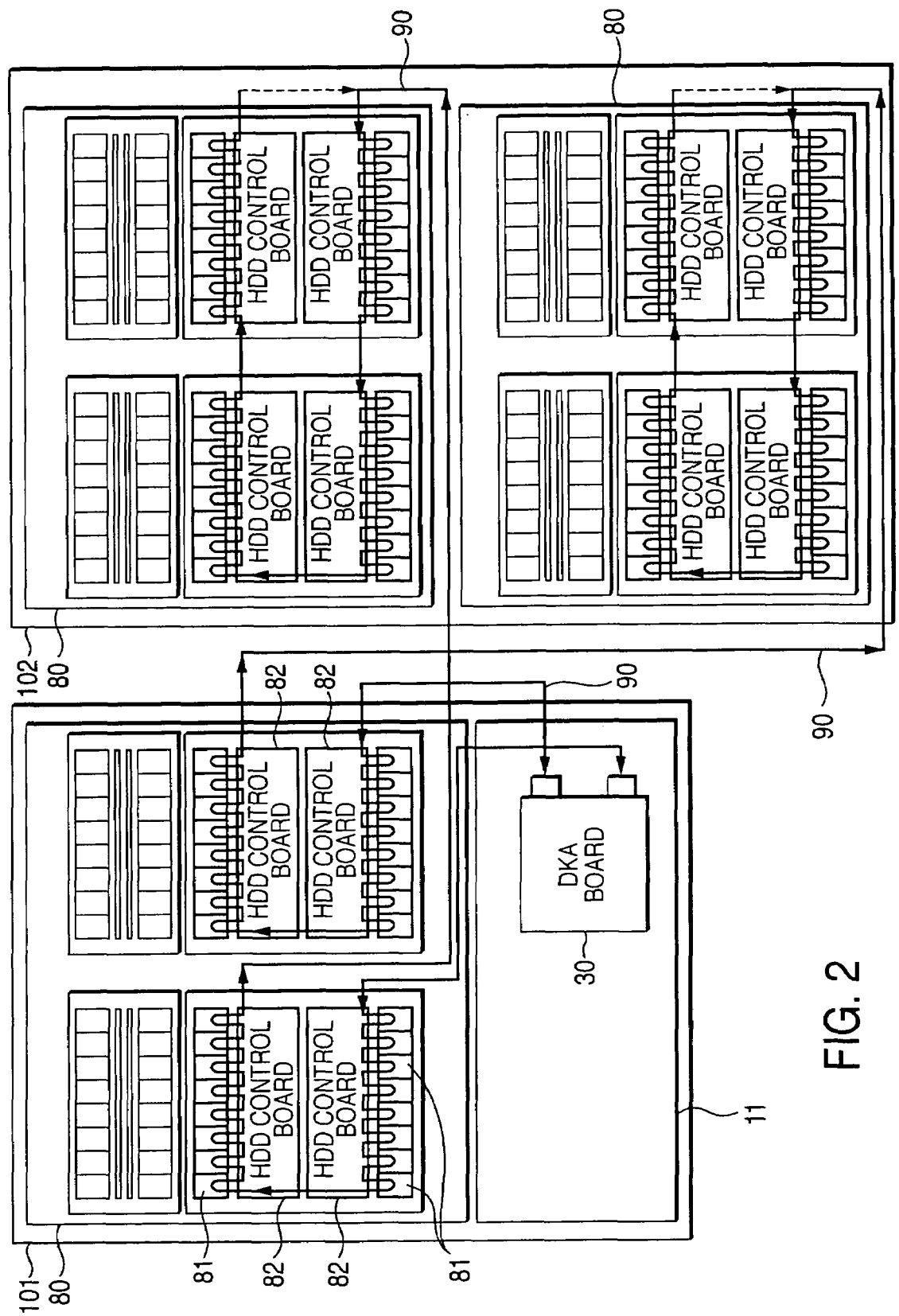
FIG. 2 is a schematic diagram in a case where the disk array device operating in the connected mode is seen from the front.

FIG. 2 is an explanatory diagram schematically showing the disk array device 10 from the front. The disk array device 10 can be configured from, for example, a basic section 101 and an additional section 102. The basic section 101 is disposed with a disk control unit 11 and the disk drive unit 80. The disk control unit 11 conducts overall control of the disk array device 10 and can be configured to include the CHA 20, the DKA 30, the cache memory 40, the shared memory 50, the switch unit 60 and the SVP 70. The additional section 102 can be configured from the plural disk drive units 80. The control of the additional section 102 is conducted by the disk control unit 11 of the basic section 101. Thus, the smallest configuration of the disk array device 10 is only the basic section 101. The additional section 102 is an option that can be added as needed.

In the example shown in FIG. 2, plural disk drive groups are connected in a connected mode to realize a large-capacity storage region. The two disk drive groups of the additional section 102 positioned in line at the top in the drawing are interconnected and also connected via a cable 90 to the disk drive group shown at the left side of the basic section 101. Similarly, the two disk drive groups of the additional section 102 positioned in line at the bottom are interconnected and also connected via another cable 90 to the disk drive group shown at the right side of the basic section 101. Thus, in the example shown in the drawing, a total of two disk drive groups where three disk drive groups are connected are shown, but this is an example for convenience of explanation. In actuality, more disk drive groups can be configured, and these can be controlled by respectively different DKA 30.

Figure 3:
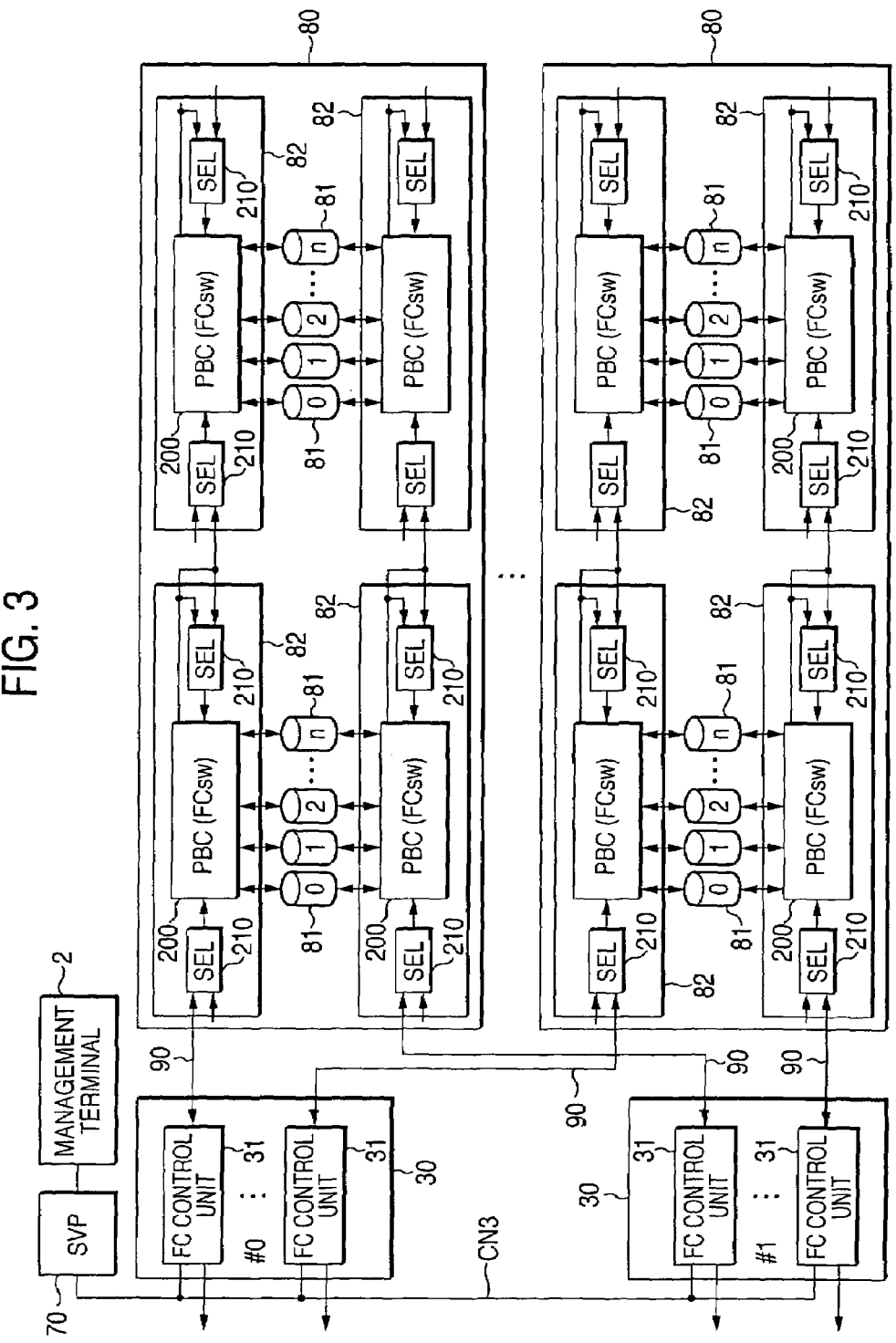
FIG. 3 is a block diagram showing the connection relation between DKA and disk drive units.

FIG. 3 is an explanatory diagram showing the logical overall configuration centering on the DKA 30 and the disk drive units 80. In the example shown in FIG. 3, two DKA 30 (#0, #1) and plural disk drive units 80 are shown.

FC control units 31 are respectively disposed in each DKA 30 in a number corresponding to the number of disk drive units 80. The FC control units 31 conduct, for example, conversion processing to the fibre channel protocol and are control logic circuits that actually control data input and output with the disk drives 81. Each FC control unit 31 is connected to the management terminal 2 via the SVP 70 through the communications network CN3. Also, each FC control unit 31 is connected to the CHA 20, the cache memory 40 and the shared memory 50 via the switch unit 60.

Moreover, the FC control units 31 are respectively connected to predetermined disk drive units 80 via cables 90. The FC control units 31 are connected only to a predetermined port group of two kinds of port groups that the disk drive units 80 have. Thus, two FC control units 31 are connected to each disk drive unit 80. These two FC control units 31 belong to respectively different DKA 30. Thus, even in a case where trouble has arisen in any one of the DKA 30, the disk drive group of the disk drive unit 80 can be accessed from the other DKA 30 via an alternate path.

The plural disk drives 81 are detachably attached to the backboards (not shown) of the disk drive units 80. In the example shown in the drawing, one disk drive group is formed by n+1 number of disk drives 81 from #0 to #n, and two disk drive groups are disposed in one disk drive unit 80. The HDD control boards 82 are respectively disposed at each port side of each disk drive group. Each disk drive 81 can conduct data input and output with the FC control units 31 of the DKA 30 via any one or both of the two HDD control boards 82 connected to that disk drive 81.

Figure 4:
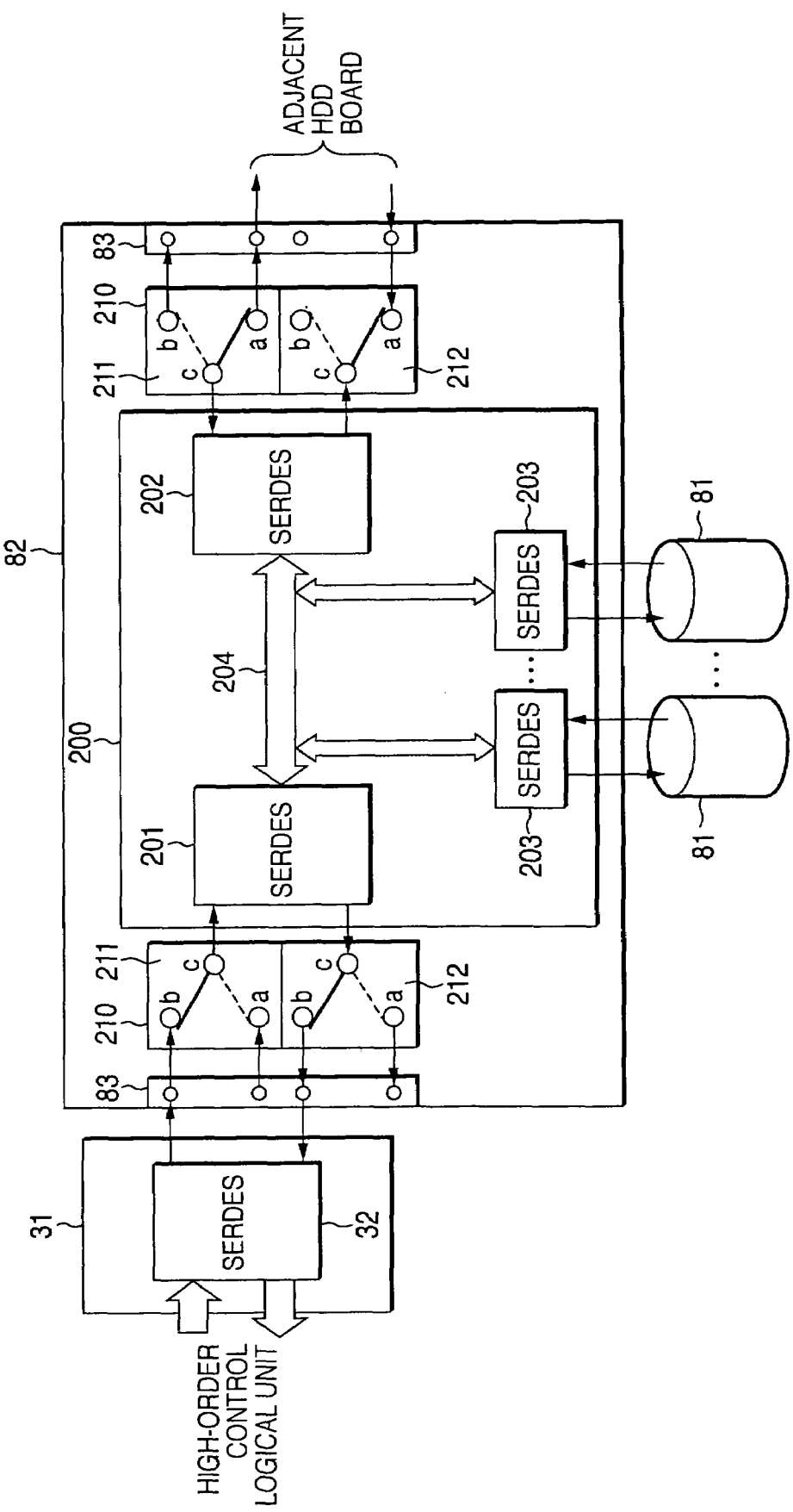
FIG. 4 is a block diagram showing the structure of an HDD control board.

HDD control board 82 is disposed with a connection circuit 200 and switch circuits 210 respectively connected to the input side and the output side of the connection circuit 200. FIG. 4 is a block diagram showing a more detailed structure of each HDD control board 82.

Each switch circuit 210 is configured from two switches 211 and 212. Each of the switches 211 and 212 can be configured as, for example, a single-pole double-throw (SPDT) switch circuit. A contact point b of each switch 211 and 212 is an external connection-use contact point (referred to below as "external contact point b"), and a contact point a of each switch 211 and 212 is an internal connection-use contact point (referred to below as "internal contact point a"). A contact point c is a common contact point.

Focusing now on the switch circuit 210 of the input side (left side in the drawing) in the example shown in FIG. 4, the FC control unit 31 is respectively connected to the external contact points b of the switches 211 and 212 via the cables 90. Additionally, the external contact point b and the common contact point c of each switch 211 and 212 are respectively connected, whereby the FC control unit 31 is connected to the HDD control board 82. Focusing now on the switch circuit 210 of the output side (right side in the drawing), the internal contact point a of each switch 211 and 212 is respectively connected to printed wiring formed on the backboard of the disk drive unit 80, and the common contact point c of each switch 211 and 212 is respectively connected to the internal contact point a. Thus, adjacent HDD control boards 82 are connected via the printed wiring of the backboards and the switch circuits 210. It should be noted that, although the external contact points b of the switches 211 and 212 of the output side are respectively open, the external contact points b may be connected together with, for example, a jumper cable.

Here, the switches 211 and 212 of each switch circuit 210 are connected to a connector 83 disposed in the disk drive unit 80 and are also connected, via the connector 83, to the FC control unit 31 and another adjacent HDD control board 82.

SERDES (Serializer and Deserializer) are respectively disposed in the connection circuit 200 and the FC control unit 31. A SERDES is a conversion circuit that converts serial data to parallel data and converts parallel data to serial data. A SERDES 201 is disposed at the input side in the connection circuit 200 and a SERDES 202 is disposed at the output side in the connection circuit 200. The input-side SERDES 201 and the output-side SERDES 202 are connected in parallel by an internal bus 204. Also, disk-side SERDES 203 are plurally connected to the internal bus 204. One disk-side SERDES 203 is disposed for each disk drive 81 that the HDD control board 82 manages.

The input-side SERDES 201 converts, to parallel data, serial data inputted from outside the HDD control board 82 and transmits the converted data to the internal bus 204. The output-side SERDES 202 converts, to serial data, parallel data received via the internal bus 204 and transmits the converted data to outside the HDD control board 82. The disk-side SERDES 203 convert, to serial data, parallel data received via the internal bus 204 and write the converted data to the disk drives 81. Alternatively, the disk-side SERDES 203 convert, to parallel data, serial data read from the disk drives 81 and transmit the converted data to the internal bus 204. Each disk-side SERDES 203 determines whether or not parallel data received via the internal bus 204 is data destined for itself (destined for the disk drive 81 that the disk-side SERDES 203 handles), is activated in a case where the data is self-destined data, and conducts data input to and data output from the disk drive 81. Whether or not the data is self-destined data can be determined, for example, on the basis of a disk drive number or the like included in the received data.

Figure 5:
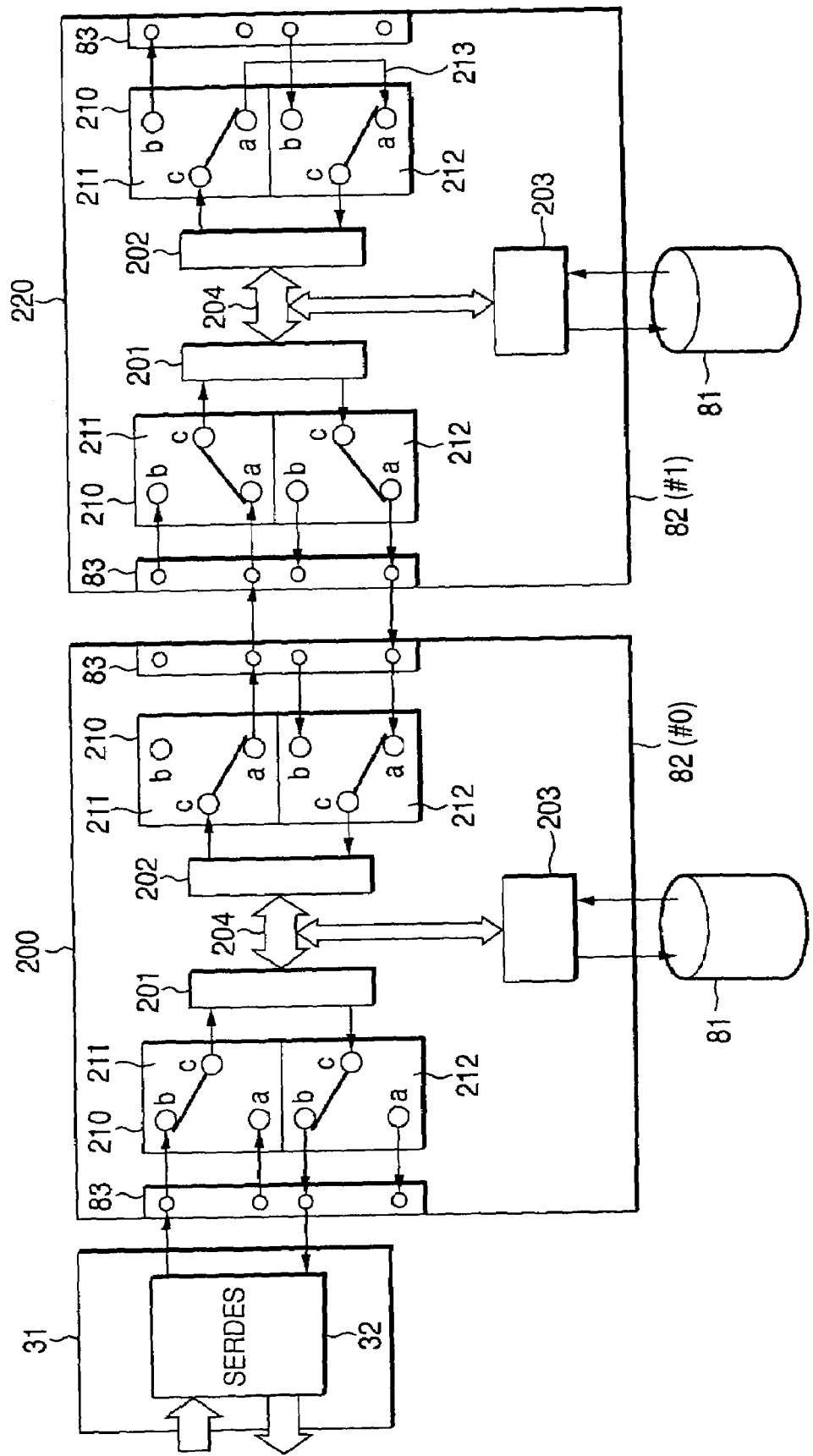
FIG. 5 is a block diagram in a case where plural HDD control boards are connected.

FIG. 5 is a block diagram showing a case where adjacent disk drive groups are connected, i.e., a case where adjacent HDD control boards 82 (#0, #1) are connected. For convenience of explanation, only one disk drive 81 is shown in FIG. 5 in regard to each HDD control board 82, but in actuality plural disk drives 81 are connected to each HDD control board 82.

The HDD control boards 82 have the same configuration. The output side of the former HDD control board 82 (#0) and the input side of the latter HDD control board 82 (#1) are connected via printed wiring formed on the backboard of the disk drive unit 80. Focusing now on the former HDD control board 82 (#0), to each switch 211 and 212 of the input side, the external contact point b and the common contact point c respectively connected to a SERDES 32 of the FC control unit 31 are connected, and to each switch 211 and 212 of the output side, the common contact point c and the internal contact point a are connected. Thus, the input side of the former HDD control board 82 (#0) is connected via cables 90 to the external FC control unit 31, and the output side of the former HDD control board 82 (#0) is connected via the printed wiring of the backboard to the adjacent latter HDD control board 82 (#1).

Focusing now on the latter HDD control board (#1), to each of the switches 211 and 212 of the input side and the output side, the internal contact point a and the common contact point c are connected. Also, the internal contact points a of the switches 211 and 212 of the output side are connected to each other via a conductor 213 such as a jumper cable. Thus, the latter HDD control board 82 (#1) is cascade-connected to the former HDD control board 82 (#0) via the printed wiring, the internal contact points a and the common contact points c.

Description will now be given in regard to a signal transmission path. Serial data inputted from the FC control unit 31 to the former HDD control board 82 (#0) via the cables 90 and the connector 83 is inputted from the external contact point b of the input-side switch 211 to the SERDES 201 via the common contact point c and converted to parallel data by the SERDES 201. The parallel data is inputted to the output-side SERDES 202 via the internal bus 204 and converted to serial data. The serial data is transmitted from the common contact point c of the output-side switch 211 to the printed wiring formed on the backboard of the disk drive unit 80 via the internal contact point a.

The serial data transmitted to the printed wiring is inputted from the connector 83 of the latter HDD control board 82(#1) to the input-side SERDES 201 via the internal contact point a and the common contact point c of the input-side switch 211. Then, the serial data is converted to parallel data by the SERDES 201, transmitted to the internal bus 204 and arrives at the output-side SERDES 202. The data converted to serial data by the output-side SERDES 202 is inputted from the common contact point c and the internal contact point a of the output-side switch 211 to the other output-side switch 212 via the conductor 213. The data reversely passes through the aforementioned path, returns to the former HDD control board 82 (#0), and returns from the former HDD control board (#0) to the FC control unit 31 via the cable 90.

Figure 6:
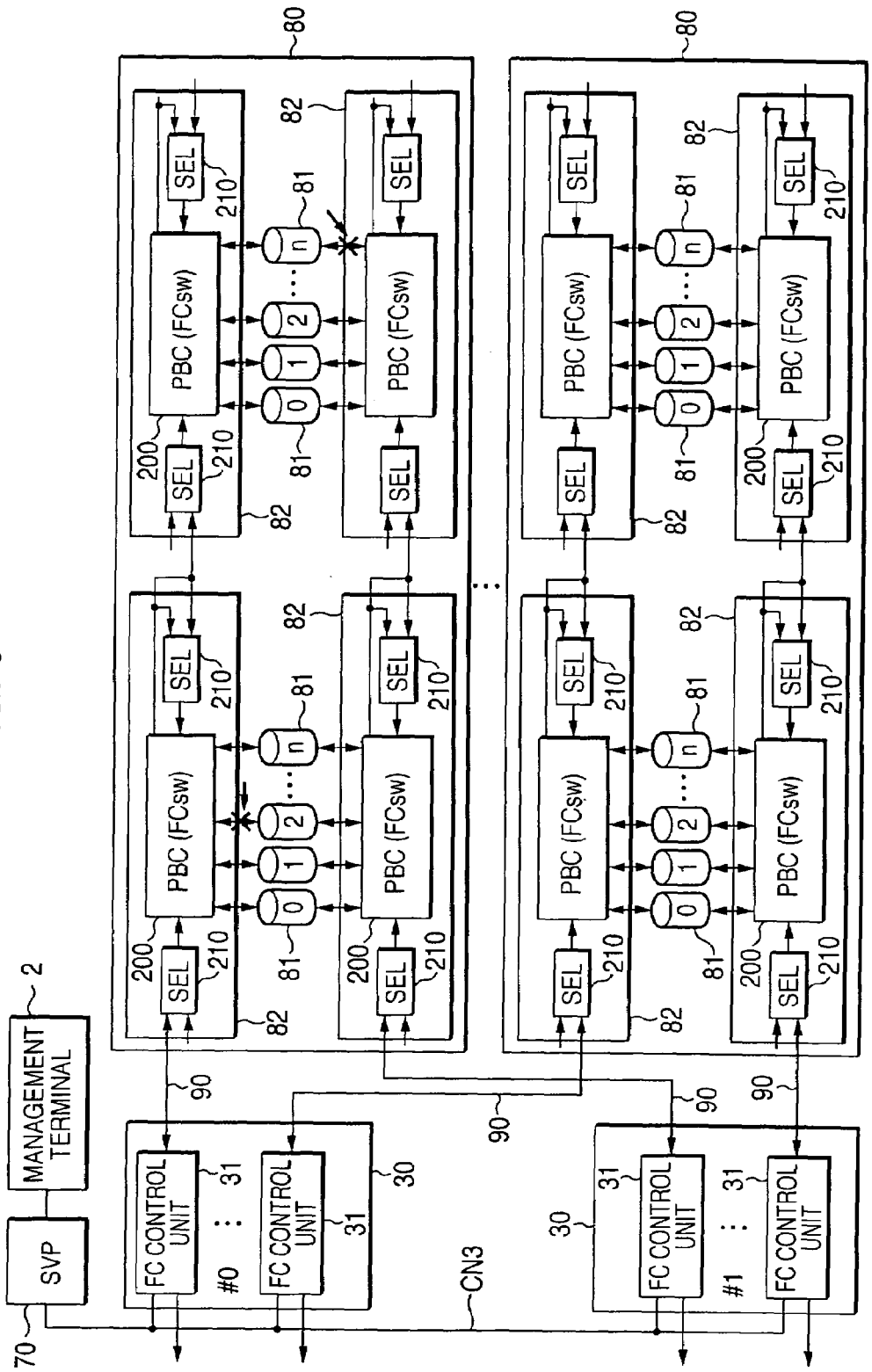
FIG. 6 is a block diagram in a case where plural troubles have simultaneously arisen.

In this manner, in the connected mode shown in FIG. 5, plural disk drive groups mounted in the disk drive unit 80 are connected as one to configure a large, single group. FIG. 6 is an explanatory diagram showing a case where trouble has arisen in the connected mode. For example, it will be assumed that trouble has simultaneously arisen at two places inside the disk drive unit 80 shown at the upper side (the path connected to the #2 disk drive at the left side and the path connected to the #n disk drive at the right side). In this case, because an HDD control board 82 is disposed for each disk drive group (in other words, because the circuit for connecting the series of disk drive groups is divided as plural control boards 82), the HDD control board 82 relating to the trouble can be replaced. Thus, resistance to trouble improves and reliability rises.

Figure 7:
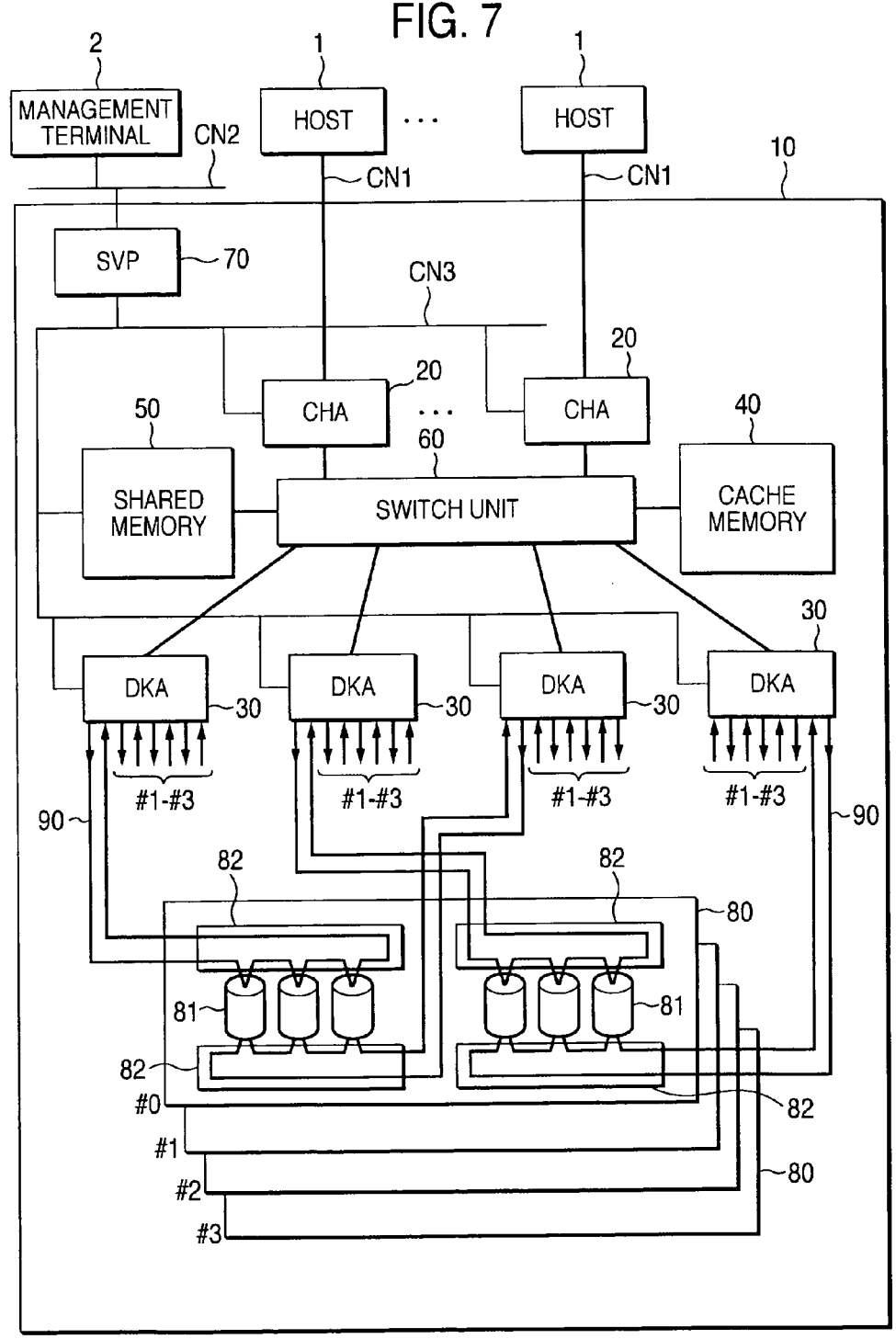
FIG. 7 is a block diagram in a case where the disk array device is operated in an independent mode.

Next, the configuration of an independent mode will be described on the basis of FIGS. 7 to 11. FIG. 7 is an explanatory diagram showing the overall configuration of the disk array device 10. In a case where the disk array device 10 is operated in the independent mode, the system administrator instructs a configuration change via the management terminal 2. When this instruction is received, the switch circuits 210 switch the mode from the connected mode to the independent mode. The disk array device 10 can operate in either of the connected mode and the independent mode, and which mode is adopted is determined by, for example, the system administrator. In the present embodiment, it is possible to interswitch between the independent mode and the connected mode simply by the switching operation of the switch circuits 210, and much of the configuration is shared in common with that of the first embodiment. Thus, description that overlaps with that of the configuration already described will be omitted and the characteristic configuration of the independent mode will mainly be described.

In the independent mode, the plural disk drive groups mounted on the same disk drive unit 80 are respectively used separately. Because two disk drive groups are mounted on each disk drive unit 80 in the example shown in the drawing, the number of individually operated disk drive groups is twice that in the case of the connected mode. Thus, two more DKA 30 are added to the disk control unit 11 in the case of the independent mode.

Figure 8:
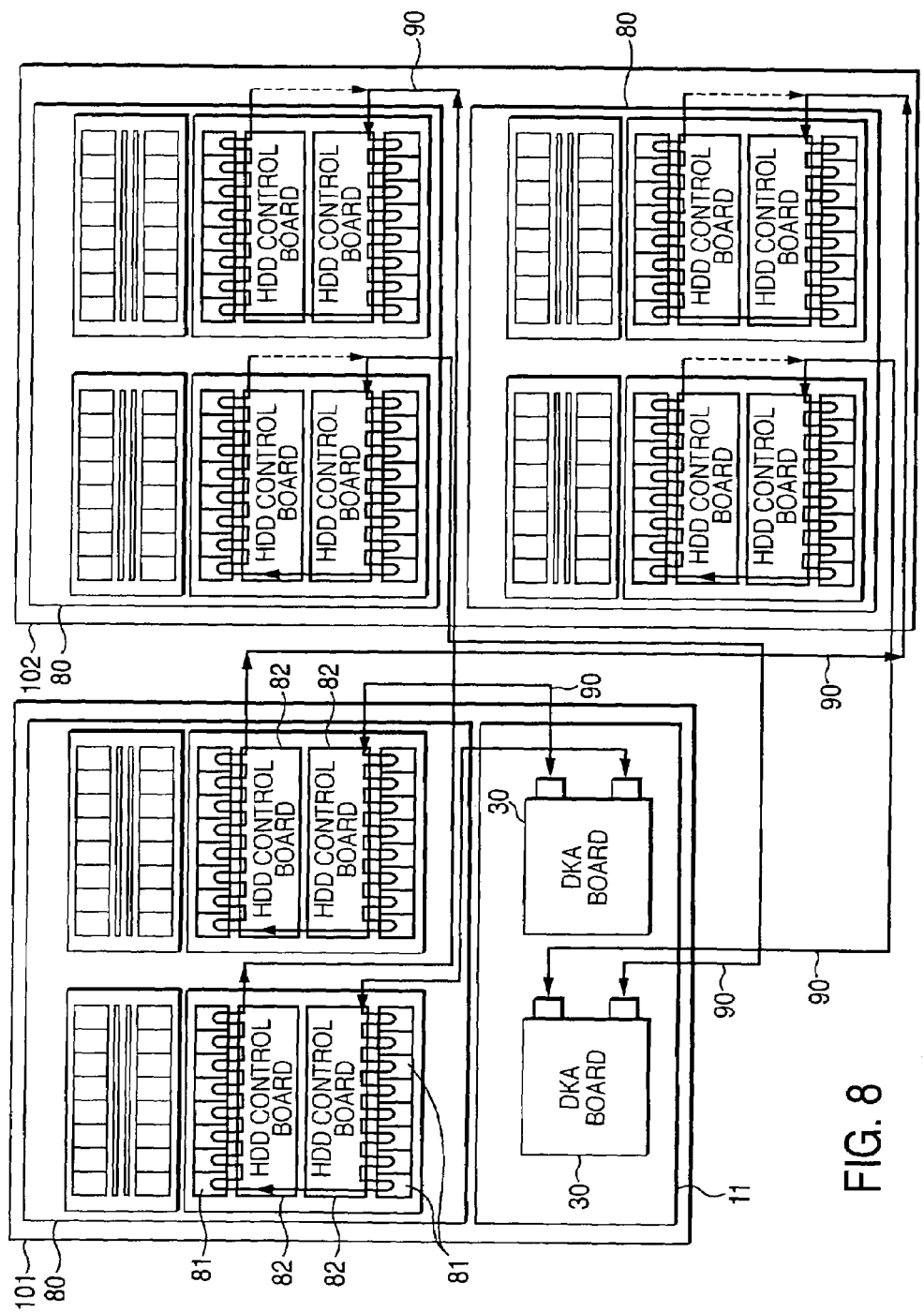
FIG. 8 is a schematic diagram where the disk array device operating in the independent mode is seen from the front.

As shown in the front schematic diagram of FIG. 8, each disk drive unit 80 of the additional section 102 includes two disk drive groups. Cables 90 are separately connected to the HDD control boards 82 handling the connection to the respective disk drive groups. The two disk drive groups mounted on the same disk drive unit 80 are respectively operated separately.

Figure 9:
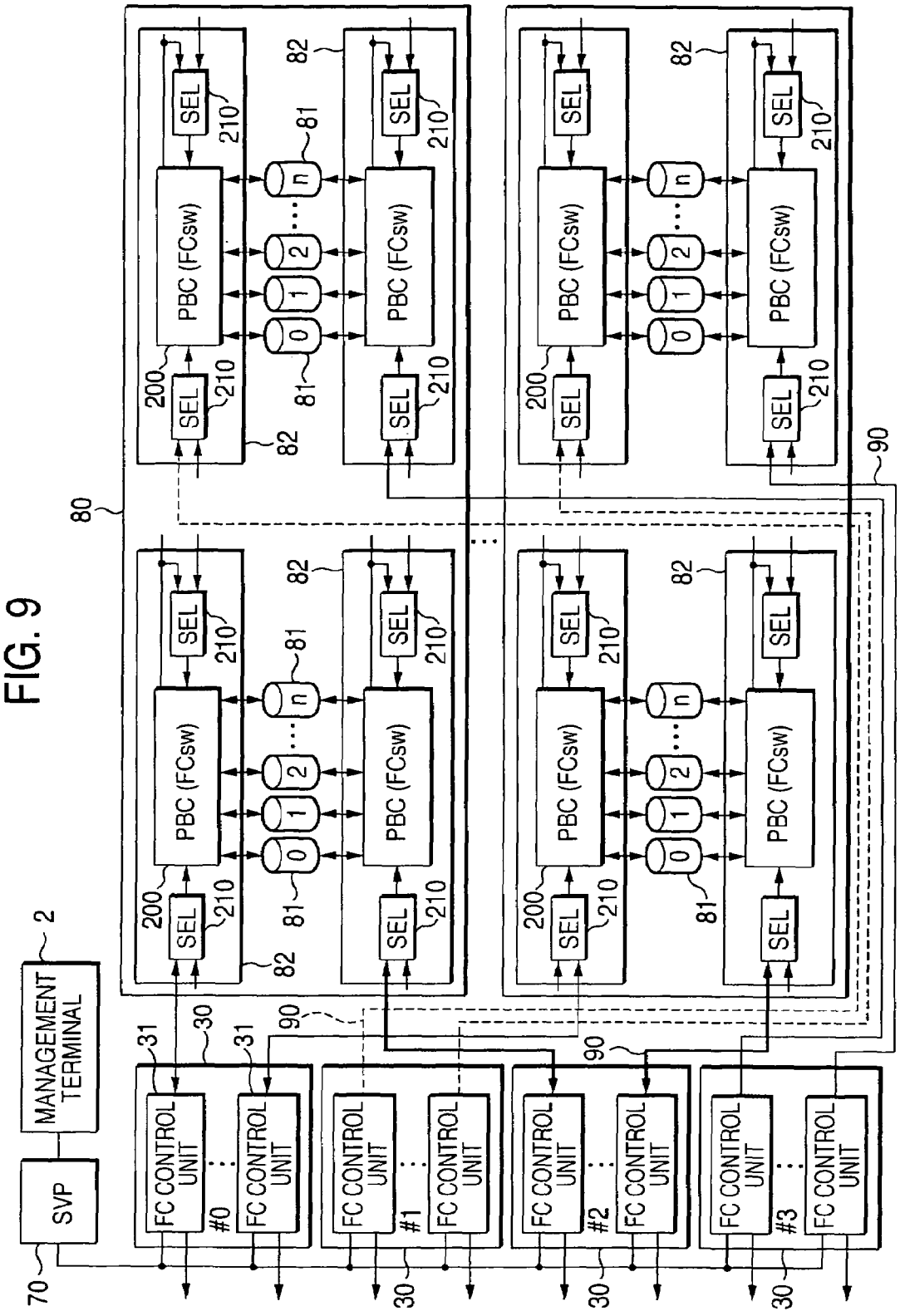
FIG. 9 is a block diagram showing the connection relation between DKA and disk drive units.

FIG. 9 is an explanatory diagram showing the configuration of the DKA 30 and the disk drive unit 80 at the time of operation in the independent mode. Compared to the configuration of the connected mode shown in FIG. 3, the disk drive groups are respectively separated inside each disk drive unit 80 in the configuration of the independent mode shown in FIG. 9. Additionally, the HDD control boards 82 handling these disk drive groups are respectively connected to predetermined DKA 30 via the cables 90.

Figure 10:
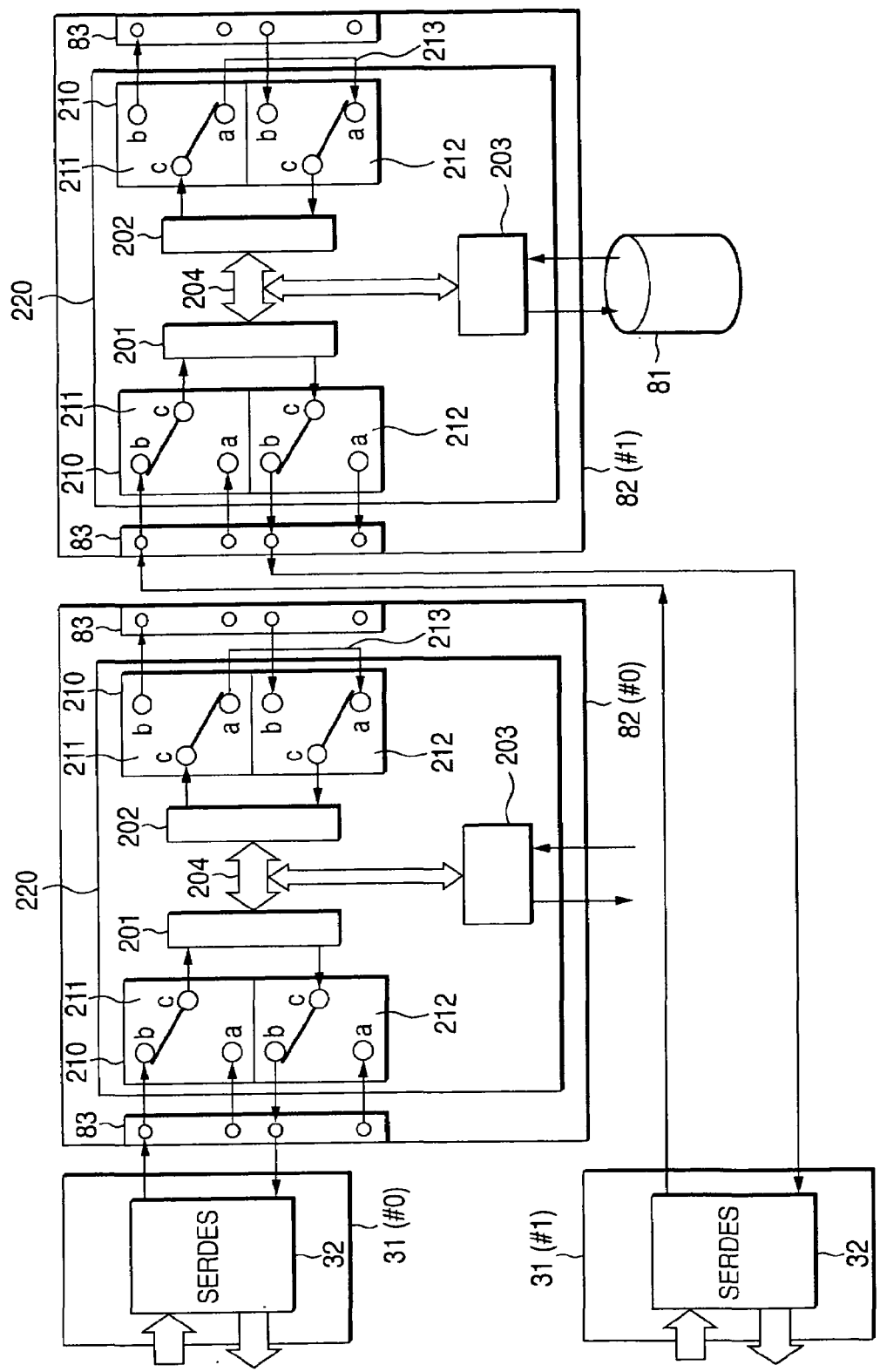
FIG. 10 is a block diagram showing the structure of an HDD control board.

FIG. 10 is a block diagram showing a case where, in the same disk drive unit 80, adjacent HDD control boards 82 are connected to respectively different DKA 30 (FC control units 31). In the case of the independent mode, the HDD control board 82 (#0) and the HDD control board 82 (#1) are separated without being interconnected. Additionally, an FC control unit 31 (#0) of one DKA 30 is connected via cables 90 to one HDD control board 82 (#0). Also, an FC control unit 31 (#1) of another DKA 30 is connected via other cables 90 to another HDD control board 82 (#1). Thus, as for the disk drive groups that the HDD control boards 82 (#0, #1) respectively handle, data input and output are conducted by respectively different FC control units 31 (#0, #1). Thus, the overall performance of the disk array device 10 becomes higher in comparison to that of the connected mode. Thus, for example, the independent mode can be expressed as a high-capacity and high-performance mode, and the connected mode can be expressed as a high-capacity and low-performance mode.

As shown in FIG. 10, in the case of the independent mode, the internal contact points a of the output-side switches 211 and 212 of the HDD control board 82 (#0) are connected to each other by the conductor 213, and the internal contact points a of the output-side switches 211 and 212 of the HDD control board 82 (#1) are connected to each other by another conductor 213.

Thus, to describe the signal transmission path in the case of the independent mode, serial data inputted from the FC control units 31 to the connectors 83 via the cables 90 is inputted from the external contact points b to the input-side SERDES 201 via the common contact points c, and converted to parallel data. The parallel data arrives at the output-side SERDES 202 via the internal buses 204 and is converted to serial data. The serial data is inputted from the common contact points c of the output-side switches 211 to the internal contact points a of the other output-side switches 212 via the internal contact points a and the conductors 213. Then, the serial data is inputted from the internal contact points a of the switches 212 to the output-side SERDES 202 via the common contact points c, and converted to parallel data. Similarly, the parallel data reversely follows the path at the time of input and returns to the FC control units 31.

In this manner, according to the present embodiment, the disk drive groups mounted on the same disk drive unit 80 are plurally divided, and respectively different HDD control boards 82 are allocated to the respective disk drive groups. Thus, even in a case where plural troubles have simultaneously arisen, it suffices to replace only the HDD control boards 82 associated with the troubles, and resistance to troubles improves. Also, in accompaniment with the fact that trouble resistance rises, the potential for recovery processing of lost data to be conducted is reduced and lowered performance time until trouble recovery can be shortened.

Also, it is possible to easily move from the connected mode to the independent mode simply by outputting a mode switching signal from the management terminal 2 to the switch circuits 210 and connecting the cables 90 to the added DKA 30. Conversely, it is possible to move from the independent mode to the connected mode simply by outputting the mode switching signal from the management terminal 2 to the switch circuits 210 and eliminating the cabling to the DKA 30. Thus, it is possible to switch the operating mode of the disk array device 10 with a simple operation, so that the ease with which the disk array device 10 can be used is improved. Moreover, because the HDD control boards 82 have substantially the same configuration, they can be mass-produced and flexible operability can be imparted thereto without significantly increasing the manufacturing costs of the disk array device 10.

Figure 11:
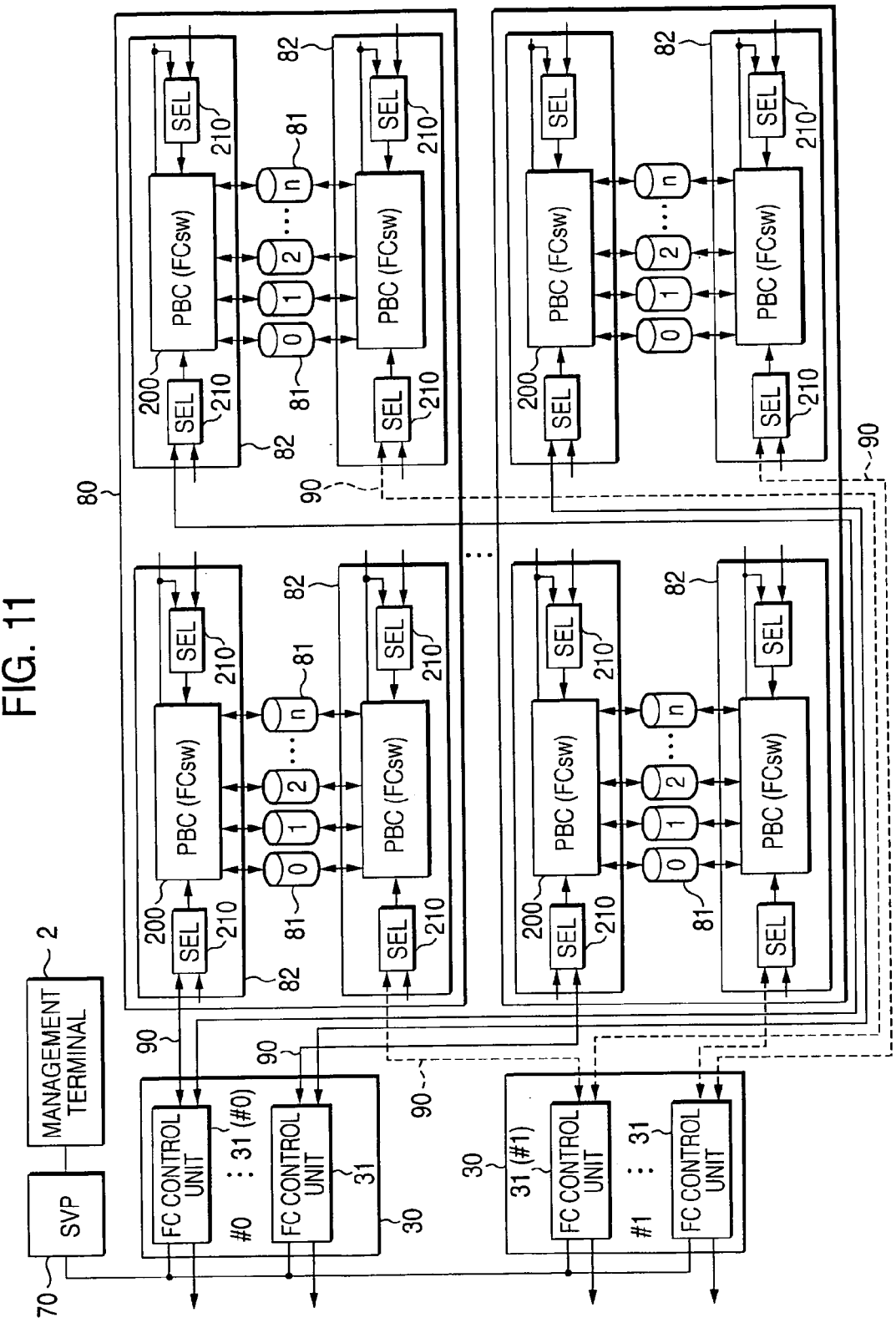
FIG. 11 is a block diagram pertaining to a first modified example and shows the connection relation between DKA and disk drive units.

FIG. 11 is a block diagram showing a first modified example of the aforementioned first embodiment. In the present example, the FC control units 31 of the DKA 30 are configured so that data transmission and reception with plural ports can be conducted. That is, each DKA 30 is respectively disposed with a number of FC control units 31 that is the same as that of the disk drive units 80, and each FC control unit 31 is configured to be able to conduct data processing of ports corresponding to the number of disk drive groups disposed in the disk drive units 80. Thus, in this case, it is possible to switch from the connected mode to the independent mode without adding DKA 30.

Figure 12:
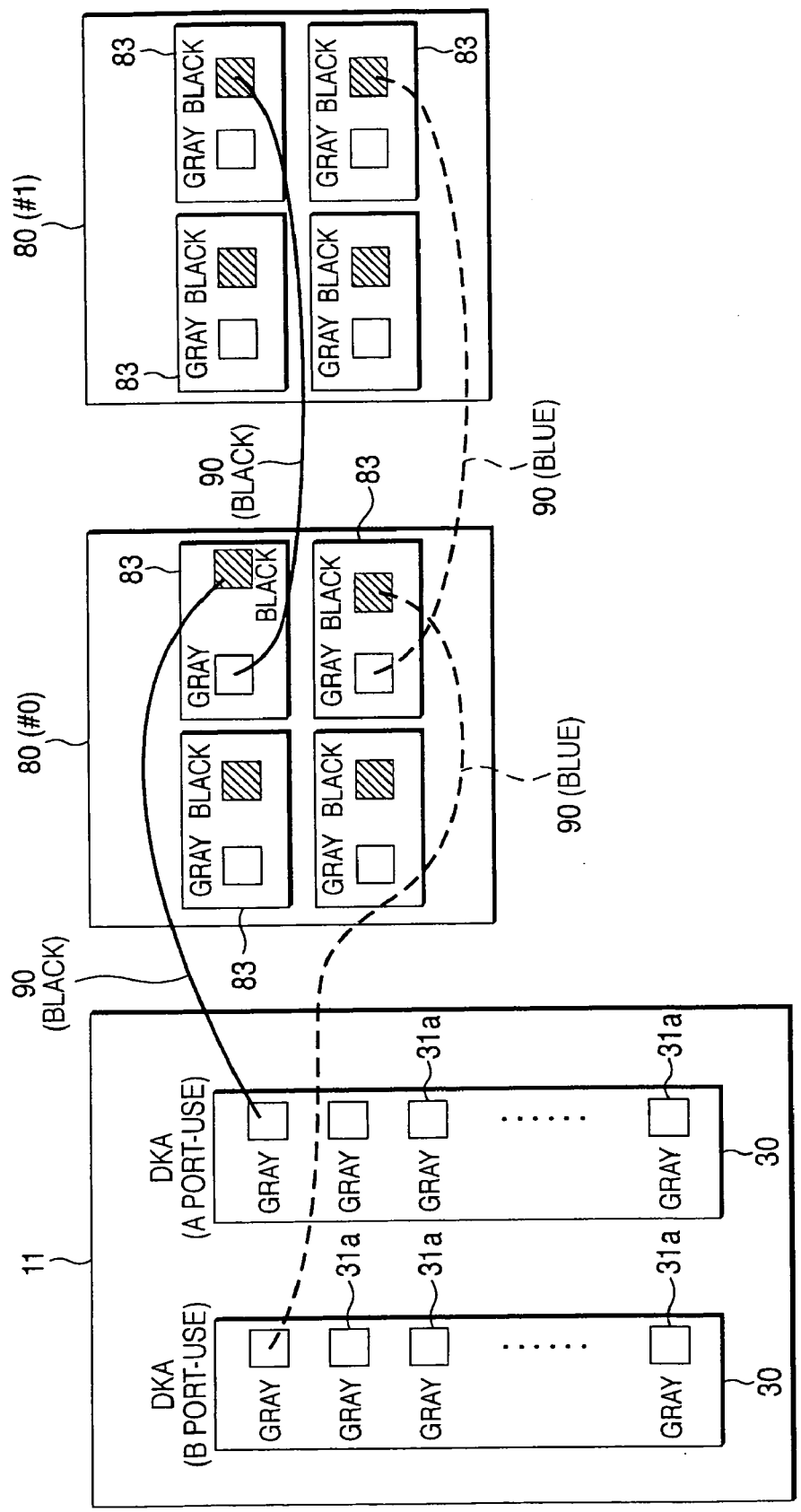
FIG. 12 is an explanatory diagram showing a cabling method of a disk array device pertaining to a second modified example.

FIG. 12 is an explanatory diagram showing a second modified example. In this modified example, the cabling between the DKA 30 and disk drive units 80 and the cabling between the disk drive units 80 are respectively improved. The DKA 30 mounted on the disk control unit 11 are respectively disposed with connectors 31a corresponding to the FC control units 31. Also, each disk drive unit 80 is respectively disposed with connectors 83 corresponding to the HDD control boards 82.

Here, a color (output color) representing the fact that the connector is an output-side connector is given to the output-side connectors of the connectors 31a and 83. Also, a color (input color) representing the fact that the connector is an input-side connector is given to the input-side connectors. For example, gray can be used as the output color and black can be used as the input color. Thus, the output color (gray) is given to all of the connectors 31a of the DKA 30 from which the cables 90 are led. In the case of the connectors 83 connected to the HDD control boards 82, the input color (black) is given to the input-side connectors in which the cables 90 from the DKA 30 or another disk drive unit 80 are inserted, and the output color (gray) is given to the connectors leading to the other disk drive unit 80.

Also, in the present example, the color of the cables 90 is changed for each port. That is, a first port color (black) is allocated to the A ports positioned at the upper side in the drawing and a second port color (blue) is allocated to the B ports positioned at the lower side in the drawing.

Thus, a maintenance worker can connect predetermined devices to each other using the colors of the connectors and the colors of the cables, without having to consult a wiring manual. Thus, the potential for wiring errors resulting from human error to arise can be reduced in a case where the operating mode of the disk array device 10 is to be changed or where a disk drive unit 80 is to be added.

It should be noted that it is not necessary for the output-side connector color and the input-side connector color to each be a single color. Plural colors may also be used for the output-side connector color and/or the input-side connector color. The colors of the cables 90 are also not limited to the first port color and the second port color. For example, different colors may be given to each connector.

Figure 13:
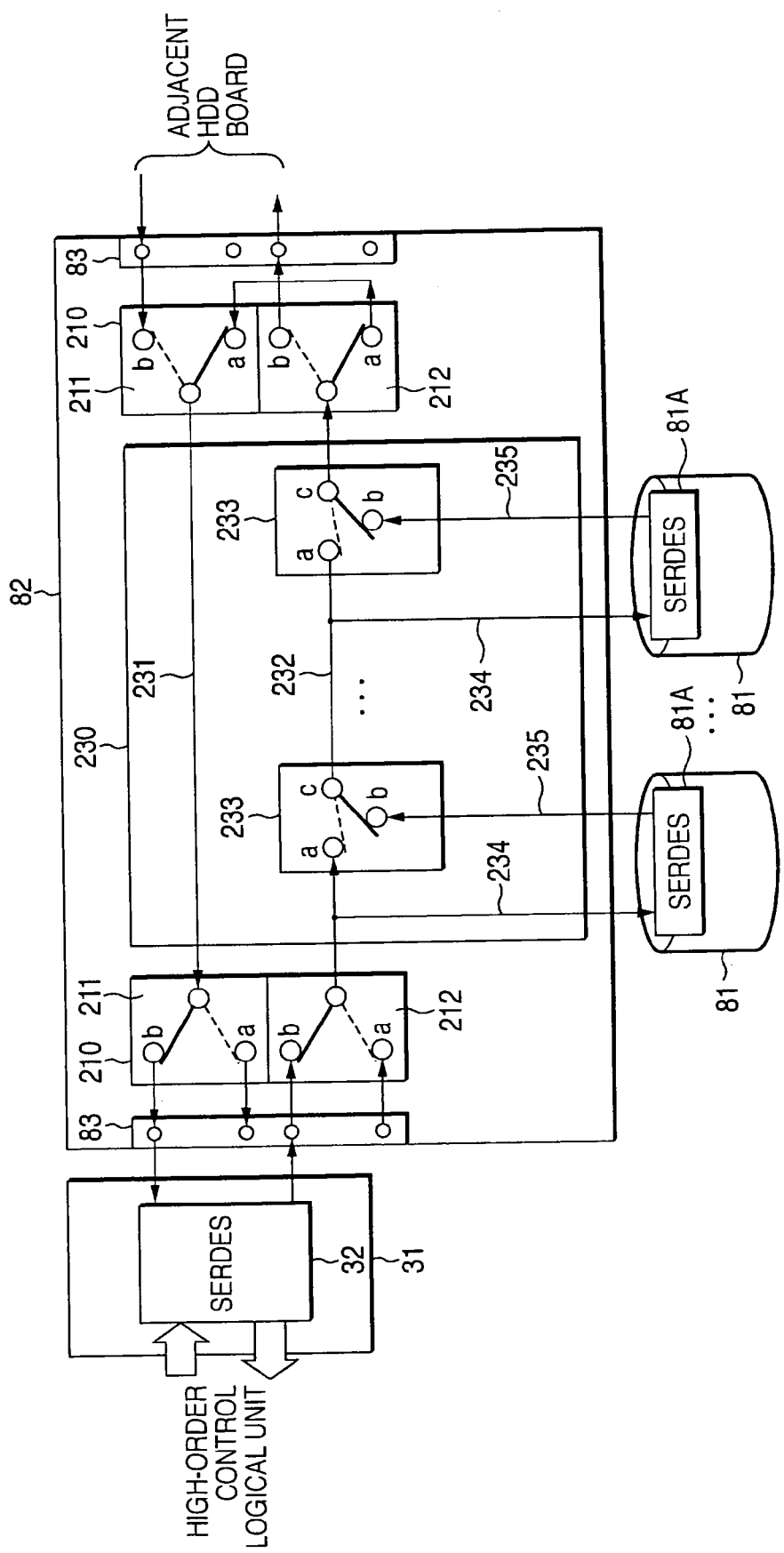
FIG. 13 is a block diagram showing the structure of an HDD control board pertaining to a third modified example.
Figure 14:
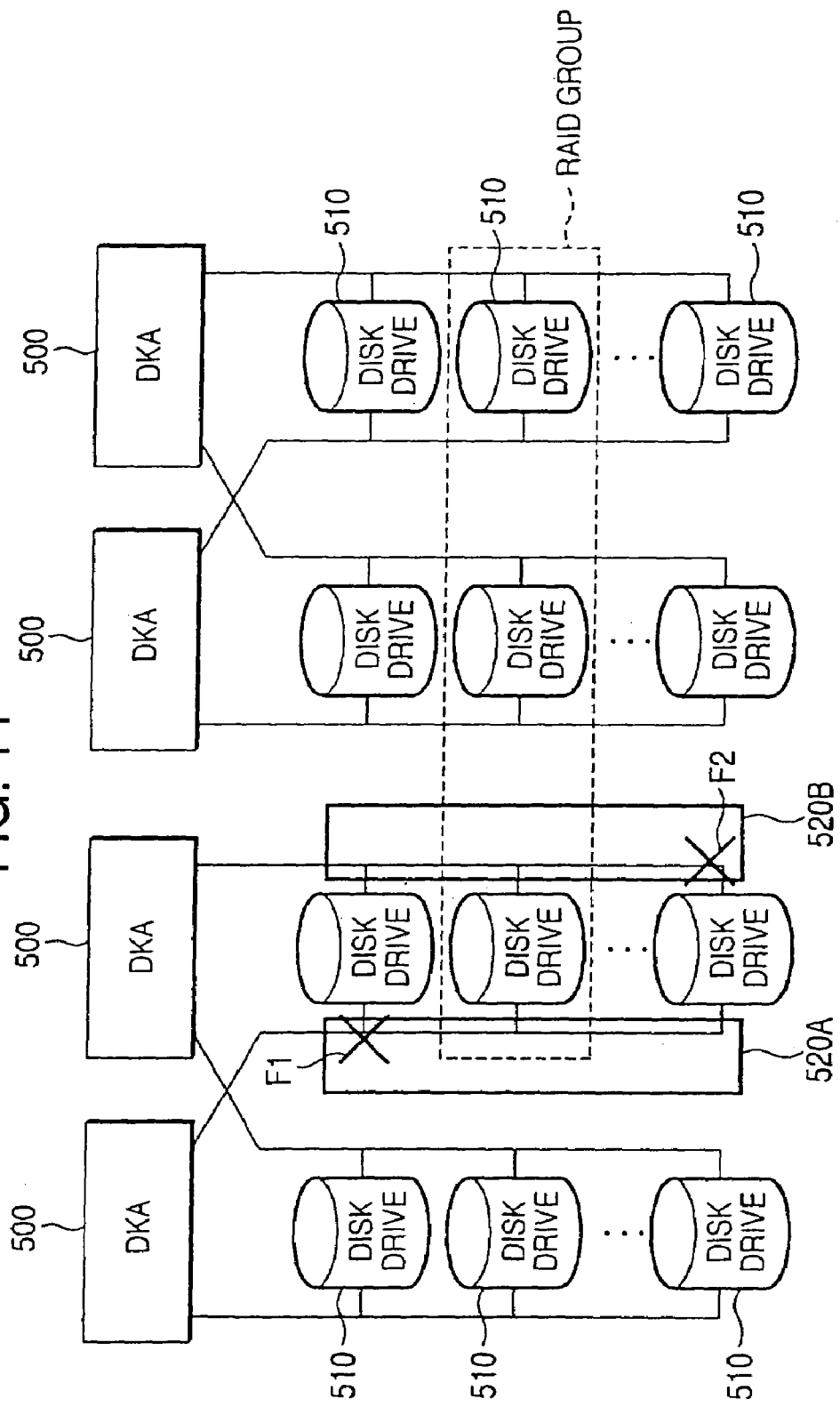
FIG. 14 is a block diagram showing the relation between disk drives and DKA according to prior art.
Figure 15:
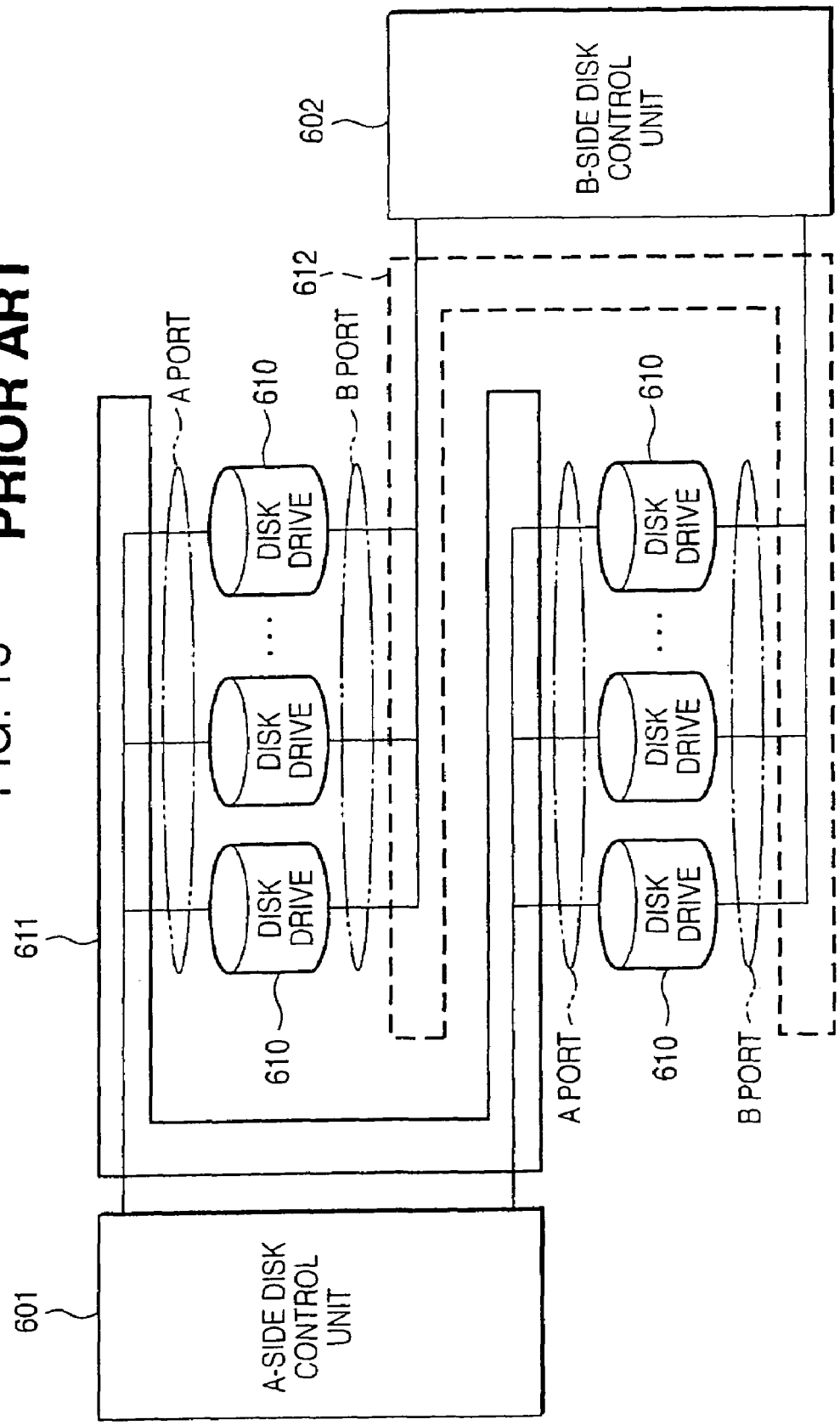
FIG. 15 is a block diagram showing the relation between disk drives and DKA in other prior art.

FIG. 13 is an explanatory diagram showing a third modified example. In this modified example, a PBC (Port Bypass Circuit) is used as the connection circuit 230 of the HDD control board 82. The connection circuit 230 is disposed with an output-side path 231, an input-side path 232, and plural switches 233 disposed midway along the input-side path 232.

The switches 233 are disposed in a number that is the same as the number of disk drives 81 that the HDD control board 82 handles. Contact points b of the switches 233 are respectively connected to SERDES 81A of the disk drives 81.

Each disk drive 81 is respectively disposed with the SERDES 81A. Each SERDES 81A is connected to the input-side path 232 via paths 234. Also, the SERDES 81A are connected to the contact points b of the switches 233 via paths 235.

Serial data outputted from the FC control board 31 is inputted from the connector 83 to the input-side path 232 via the external contact point b and the common contact point c of the switch 212. The serial data is inputted to the SERDES 81A of each disk drive 81 via the paths 234 and converted to parallel data.

The parallel data read from the disk drives 81 is converted to serial data by the SERDES 81A and sent to the input-side path 232 via the contact points b and common contact points c of the switches 233. The serial data is sent from the input-side path 232 to the output-side path 231 via the output-side switch 212 and switch 211. Moreover, the serial data is inputted from the output-side path 231 to the FC control unit 31 via the input-side switch 211.

It should be noted that the present invention is not limited to the embodiments described above. A person skilled in the art can make various additions or changes within the scope of the invention. For example, the disk drive groups mounted on the same backboard can be divided into three or more groups. Also, the method of connecting the HDD control boards 82 is not limited to the above-described examples, and various methods can be used. For example, the invention is not limited to the case where the internal contact points are connected to each other by the printed wiring formed on the backboards, and the external contact points may also be connected to each other with cables. In this case, manual labor for connecting the cables becomes necessary.

What is claimed is:

1. A disk array adaptable to communicate with an externally located high-order device, the disk array device device comprising:
   a channel adapter that controls data transmission and reception with the high-order device;
   a storage device that stores data;
   a storage device control board to which the storage device is connected;
   a disk adapter that is connected to the storage device via the storage device control board and controls data transmission and reception with the storage device; and
   a management unit that is respectively connected to the disk adapter and the channel adapter, wherein
   the storage device control board includes:
   a connection circuit that is connected to the storage device, and
   switch circuits that are respectively disposed at an input side and an output side of the connection circuit and are switchable between a connected mode where they are connected to an adjacent storage device control board and an independent mode where they are separated from the adjacent storage device control board, and
   the switch circuits are switchable between the connected mode and the independent mode by an output signal from the management unit.

2. The disk array device of claim 1, wherein the storage device control board and the adjacent storage device control board are respectively mounted on a same attachment-use board.

3. The disk array device of claim 1, wherein
   when the switch circuits are in the connected mode, the storage device control board and the adjacent storage device control board are both connected to the disk adapter, and
   when the switch circuits are in the independent mode, the storage device control board is connected to the disk adapter and the adjacent storage device control board is connected to a second disk adapter different than the disk adapter.

4. The disk array device of claim 1, wherein the storage device includes a first port and a second port, with the first port and the second port being connected to respectively different storage device control boards and the different storage device control boards being connected to respectively different disk adapters.

5. The disk array device of claim 1, wherein the connection circuit is configured by any of a port bypass circuit and a fibre channel switch.

6. The disk array device of claim 4, wherein respectively different colors are associated with input-side connectors and output-side connectors with which the disk adapter and the storage device control board are disposed, and
   respectively different colors are associated with signal lines associated with the first port and signal lines associated with the second port of signal lines connecting the respective connectors to each other.

* * * * *